US008553937B2

United States Patent
Jelinek et al.

(10) Patent No.: US 8,553,937 B2
(45) Date of Patent: Oct. 8, 2013

(54) CONTROLLER FOR AN IMAGE STABILIZING ORTHOGONAL TRANSFER CHARGE-COUPLED DEVICE

(75) Inventors: Jan Jelinek, Plymouth, MN (US); Sharath Venkatesha, Golden Valley, MN (US); Vincent Jacobson, Eden Prairie, MN (US)

(73) Assignee: Honeywell International Inc., Morristown, NJ (US)

( * ) Notice: Subject to any disclaimer, the term of this patent is extended or adjusted under 35 U.S.C. 154(b) by 172 days.

(21) Appl. No.: 13/277,621

(22) Filed: Oct. 20, 2011

(65) Prior Publication Data

US 2013/0101155 A1    Apr. 25, 2013

(51) Int. Cl.
  *G06K 9/00* (2006.01)
  *H04N 5/76* (2006.01)
  *H04N 3/14* (2006.01)

(52) U.S. Cl.
  USPC .................... 382/103; 348/231.1; 348/272

(58) Field of Classification Search
  USPC ................ 382/103, 107, 164, 312, 314, 317;
    348/222.1, 231.1, 236, 249, 250, 264,
    348/272, 294, 298, 333.1, 744; 356/124,
    356/456
  See application file for complete search history.

(56) References Cited

U.S. PATENT DOCUMENTS 7,217,601 B1 *   5/2007   Burke et al. .................. 438/144

\* cited by examiner

*Primary Examiner* — Abolfazl Tabatabai
(74) *Attorney, Agent, or Firm* — Schwegman, Lundberg & Woessner, P.A.

(57) ABSTRACT

An apparatus includes a video sensing device, a velocity vector estimator (VVE) coupled to the video sensing device, a controller coupled to the velocity vector estimator, and an orthogonal transfer charge-coupled device (OTCCD) coupled to the controller. The video sensing device transmits a plurality of image frames to the velocity vector estimator. The controller receives a location of an object in a current frame, stores locations of the object in one or more previous frames, predicts a motion trajectory and the predicted location of the object on it in a subsequent frame as a function of the locations of the object in the current frame and the one or more previous frames, and transmits the predicted location of the object to the OTCCD. The OTCCD shifts its image array of pixels as a function of the predicted location of the object.

19 Claims, 8 Drawing Sheets

CONTROLLER FOR AN IMAGE STABILIZING ORTHOGONAL TRANSFER CHARGE-COUPLED DEVICE

GOVERNMENT INTEREST

The present invention was made with support from the Intelligence Advanced Research Project Activity's (IARPA) Biometrics Exploitation Science and Technology (BEST) program under contract W911NF-10-C-0022 issued by U.S. Army RDECOM Acquisition Center on Dec. 17, 2009. The United States government has certain rights in this invention.

TECHNICAL FIELD

The present disclosure relates to image stabilization, and in an embodiment, but not by way of limitation, a controller for an image stabilizing orthogonal transfer charge coupled device.

RELATED APPLICATIONS

This application is related to U.S. application Ser. No. 12/699,368, which was filed on Feb. 3, 2010.

BACKGROUND

A conventional approach to acquiring high quality iris or face images of moving subjects is to freeze the subject motion by using extremely short exposures. The subject must be brightly illuminated by a flash in order to get a well exposed image. This approach commonly breaks down for larger distances because the flash power that is required in order to obtain an acceptable image often becomes eye unsafe.

Producing a well exposed image without flash illumination typically requires extending the image exposure, which degrades the image quality. One drawback with this approach is that extending the image exposure typically introduces motion blur unless the relative motion between the subject and the camera sensor is eliminated.

The motion of a subject relative to the camera sensor can be real, apparent or both. Real motion is the result of the physical motion of the subject and/or the sensor. Real motion is described by a velocity vector which gets decomposed into two components. The axial velocity vector points toward the sensor and is aligned with the optical axis of the sensor. The lateral velocity vector is the velocity vector projection into an X-Y plane perpendicular to the optical axis. Axial velocity affects the focusing of camera optics and may introduce magnification blur for long exposures. Lateral velocity causes motion blur.

Moveable lenses are widely used as image stabilizing elements in telephoto objectives for photographic cameras. One known approach is to use a pair of inertial sensors inside the objective to detect camera motion resulting from the user's unsteady hand and then move the stabilization lens during exposure to compensate for it. An alternative approach employs a tip-tilt mirror to compensate for the relative motion. This approach is applicable only to scenarios in which all motion is due to that of the camera, because sensors cannot be installed on the moving subject that is imaged.

One drawback with these types of solutions is that they typically cannot track very fast motions. In addition, these approaches usually utilize delicate mechanical parts that make their use problematic in military and security applications.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, electrical, and optical changes may be made without departing from the scope of the present invention. The following description of example embodiments is, therefore, not to be taken in a limited sense, and the scope of the present invention is defined by the appended claims.

Figure 1:
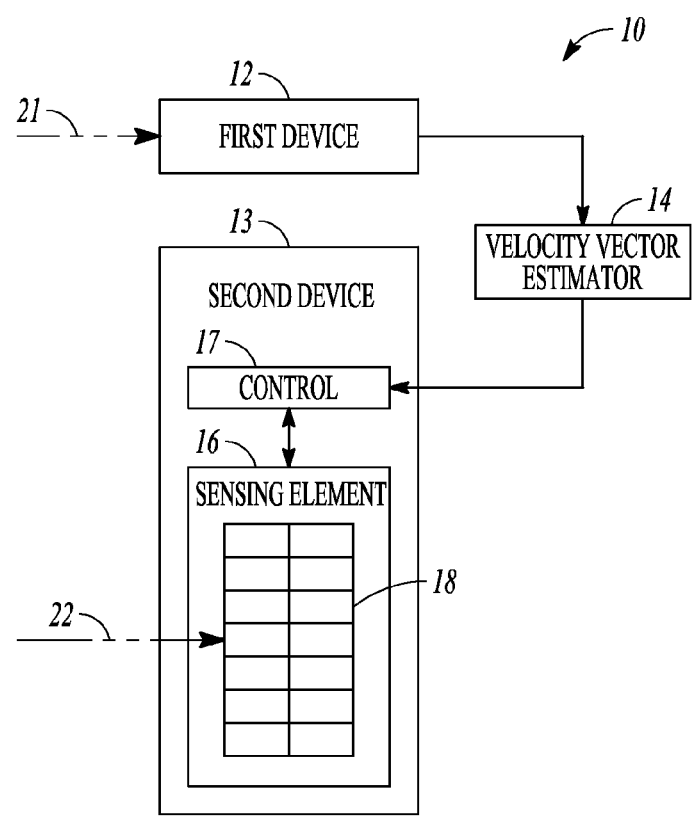
FIG. 1 illustrates an example image acquisition system.

FIG. 1 illustrates an example image acquisition system 10. The example image acquisition system 10 includes a first image recording device 12 that records a series of images of a subject. The example image acquisition system 10 further includes a lateral velocity vector estimator (VVE) 14 that receives the series of images from the first image recording device 12 and estimates the lateral velocity vectors of the subject relative to the image acquisition system 10.

The example image acquisition system 10 further includes a second image recording device 13. The second image recording device 13 includes an orthogonal transfer charge-coupled device (OTCCD) sensing element 16 which records a target image of the subject. The orthogonal transfer CCD sensing element 16 includes an array of pixels 18 that captures the target image.

The image acquisition system 10 further includes a controller 17 that shifts the array of pixels 18 within the orthogonal transfer CCD sensing element 16. The controller 17 shifts the array of pixels 18 based on the lateral velocity vector estimates provided by the lateral velocity estimator 14.

In some embodiments, the first image recording device 12 is a camera although it should be noted that the first image recording device 12 may be any device that is capable of sending a series of images of the subject to the lateral velocity estimator 14. In other embodiments, the first image recording device 12 may be a scanning laser/range finder that is capable of determining the distance from the subject to the image acquisition system 10 and measuring the velocity vector of the subject relative to the image acquisition system 10 in real time.

The lateral velocity estimator 14 may be any device that is capable of receiving a series of images of the subject from the first image recording device 12. As examples, the lateral velocity estimator 14 may use range data from a scanning laser range finder, or depth images from a camera whose sensor has pixels capable of real time time-of-flight ranging.

Depending on the application where the image acquisition system 10 is utilized, the lateral velocity vector estimator 14 may receive the series of images from the first image recording device 12 before the second image recording device 13 starts recording the target image of the subject. In other embodiments, the lateral velocity vector estimator 14 may receive the series of images from the first image recording device 12 while the second image recording device 13 records the target image of the subject. The image acquisition system 10 may include closed loop control such that estimates are applied immediately after they are computed (i.e., in real time). The rate of updates will be dictated by the frame rate of first image recording device 12. In addition, the number of updates may be the same as the number of images in the series of images.

Using an Orthogonal Transfer CCD sensor element 16 as the image stabilizing element improves performance of the image acquisition system 10 because unlike other known implementations of the image stabilization concept, Orthogonal Transfer CCD sensor element 16 involves no moveable mechanical parts (e.g., lenses, minors or sensor chips). The orthogonal transfer CCD sensor element 16 moves the potential wells that correspond to the array of pixels 18 and accumulate their photoelectrons. Since the wells do not have any inertia, the wells can be moved extremely fast by manipulating in real time the voltages that define the operation of the orthogonal transfer CCD sensor element 16. With no moveable mechanical parts, the orthogonal transfer CCD sensor element 16 offers an extremely rugged solution that is well suited for security and military applications.

The orthogonal transfer CCD sensor element 16 offers an appealing alternative to mechanically delicate tip-tilt mirrors and moveable stabilizing lenses. The orthogonal transfer CCD sensor element 16 stabilizes the image not by mechanically reconfiguring the optics or moving the sensing chip, but rather by electronically changing the location of the orthogonal transfer CCD sensor element 16 array of pixels 18.

Since the image acquisition system 10 employs an image stabilization concept, the image acquisition system 10 needs to estimate the relative velocity between the subject and the image acquisition system 10 in order to properly drive the orthogonal transfer CCD sensor element 16. The velocity vector can be estimated before or during the image exposure. Estimating the velocity vector before the image exposure is limited to simpler scenarios involving only physical motion of the subject. In the latter case, the series of images provided to the lateral velocity vector estimator 14 during the image exposure is continuously evaluated as its frames are arriving to determine the velocity vector. The velocity vector updates are then used to drive in real time the potential well movements in the orthogonal transfer CCD sensor element 16.

The controller 17 may issue updates to the orthogonal transfer CCD sensor element 16 at rates on the order of 100 updates/sec. The update can include calls for shifting the pixels in the array of pixels 18.

In some embodiments, the orthogonal transfer CCD sensor element 16 may be capable of executing array shifts at rates on the order of 100,000 updates/sec. However, the orthogonal transfer CCD sensor element 16 may only be able to execute single step shifts (i.e., one pixel left, right or none and/or one pixel up, down or none).

In the example embodiment illustrated in FIG. 1, the first image recording device 12 and the second image recording device 13 receive the light radiated by or bouncing off the subject along different optical paths 21, 22. The first image recording device 12 records the series of images of the subject along a first optical path 21 and the second image recording device 13 records images along a different second optical path 22.

Figure 2:
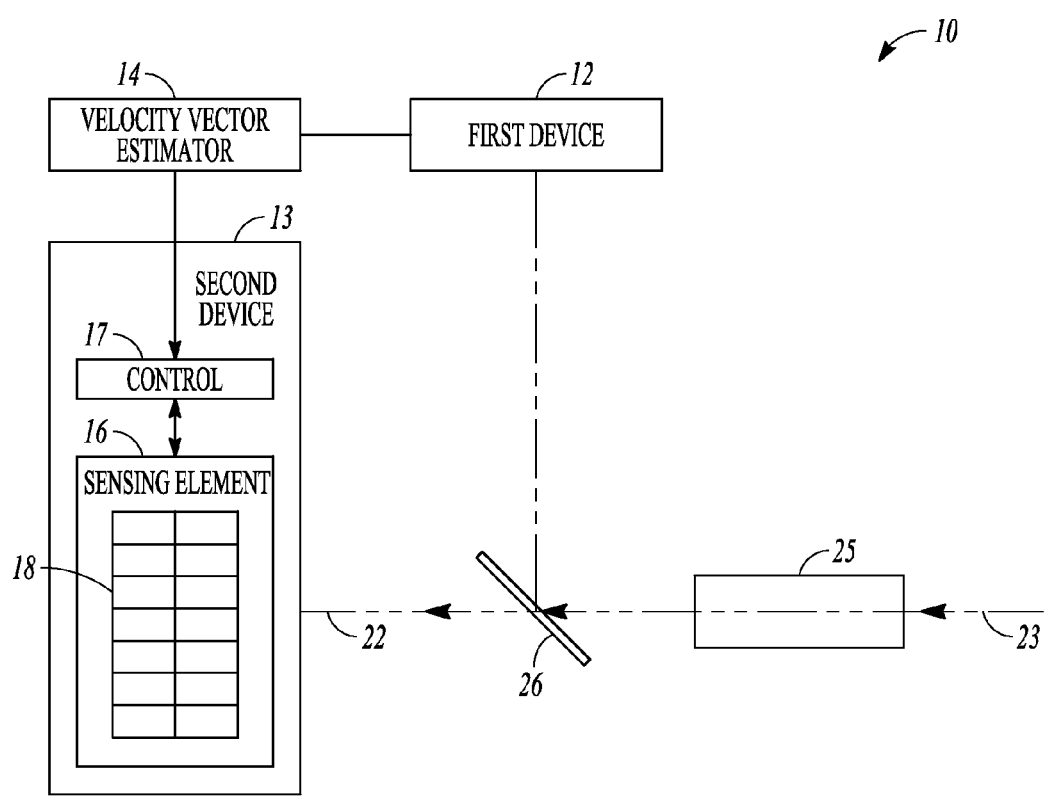
FIG. 2 illustrates another example image acquisition system.

FIG. 2 shows an example embodiment where the first image recording device 12 and the second image recording device 13 at least partially record their respective images along the same optical path 23 from the subject. In the example embodiment that is illustrated in FIG. 2, the light travels along common optical path 23 through a common lens 25 before the light is split using a splitter 26. Once the light is split, some light travels along optical path 21 to the first image recording device 12 and some light travels along optical path 22 to the second image recording device 13.

Depending on the hardware that is used in the image acquisition system 10, the first image recording device 12 and the second image recording device 13 may record light at different, the same or overlapping wavelengths. In the example embodiment that is illustrated in FIG. 2, the splitter 26 directs light having wavelengths in the visible range of the spectrum to the first image recording device 12 and directs light in the near infrared range of the spectrum to the second image recording device 13.

An example method of obtaining a target image of a subject will now be described with reference to FIGS. 1 and 2. The method includes recording a series of images of the subject using an image acquisition system 10 and estimating lateral velocity vectors of the subject relative to the image acquisition system 10. The method further includes recording a target image of the subject onto an array of pixels that form part of an orthogonal transfer CCD sensing element within the image acquisition system and adjusting the array of pixels based on the estimated lateral velocity vectors.

In some embodiments, recording a series of images of the subject may include recording a series of images of the subject using a first device 12, and recording the target image of the subject may include recording the target image of the subject with a second device 13. In addition, recording a series of images of the subject using a first device 12 may include recording the series of images along a different (FIG. 1), similar (FIG. 2) or identical optical path to recording of the target image of the subject with the second device 13.

It should be noted that recording a series of images of the subject using a first device 12 may include recording the series of images in a spectral range that is different, overlapping or identical to the spectral range where the target image of the subject is recorded with the second device 13.

Recording a series of images of the subject using an image acquisition system 10 is done while recording the target image of the subject onto an array of pixels 18. In addition, estimating lateral velocity vectors of the subject relative to the image acquisition system 10 is done while recording the target image of the subject onto the array of pixels 18.

The image acquisition system 10 described herein may be used to consistently produce high-quality iris and/or face images of moving, uncooperative subjects at larger distances, where the use of a flash to freeze the motion is difficult because of eye safety concerns. The image acquisition system 10 may be used to produce a well exposed image (without flash illumination) by extending the image exposure without degrading the image quality. The image acquisition system 10 is able to extend the image exposure without introducing the motion blur by using the Orthogonal Transfer CCD sensor element 16 as the image stabilizing element.

Consequently, motion blur in images of moving objects can be eliminated or reduced by stabilizing the image projection during exposure. As detailed above, such a stabilization can be implemented by means of an Orthogonal Transfer CCD sensor array, which collects photoelectrons in potential wells that are not firmly attached to individual array pixels by design, but can be moved around in real time underneath the pixel infrastructure implanted on the sensor wafer surface.

For the image stabilization to work well, the array must be properly shifted in real time to make it track the moving object. The remainder of this disclosure addresses embodiments that perform such tracking.

Even controllers processing on the order of a hundred frames per second may not ensure good tracking if they work in a purely reactive manner. Control theory asserts that only a predictive controller can offer small tracking errors at acceptable rates. The accuracy of prediction is principal constraint limiting the attainable accuracy of tracking. The more accurate the tracking, the higher the quality of the image collected by the second device 13. In some scenarios, the issue is further aggravated by the need to update the predictions hundreds of times per second, which puts an upper bound on their computational complexity.

In an embodiment, a reasonable compromise between accuracy and computational complexity is implemented by assuming the object motion trajectory can be well approximated locally by either a straight line or a circular segment. These two controller designs can be referred to as a 2-frame controller and a 3-frame controller, respectively. The controllers take object locations found in the current and last one or two frames by the velocity vector estimator (VVE), respectively, and use these locations to predict the object motion trajectory and the location on it where the object is predicted to appear in a future frame. The trajectory segment leading to this predicted location is then sub-sampled into shorter segments whose coordinates are sent to the OTCCD camera for execution.

In an embodiment, the straight lines or circular segment trajectory approximations are calculated using object locations observed in the current and any number of past frames. The approximations are fitted to the observed data by a suitable method known in mathematics, for example by a least-mean-square-error (LMSE) fitting method. While this generalization does not change the principle of operation of the 2- and 3-frame controllers, it may make them more robust in the presence of random location measurement errors. Regardless how many observations a controller uses, we still call them 2- and 3-frame controllers to indicate whether they use a line or circle for motion trajectory local approximation.

Figure 3A:
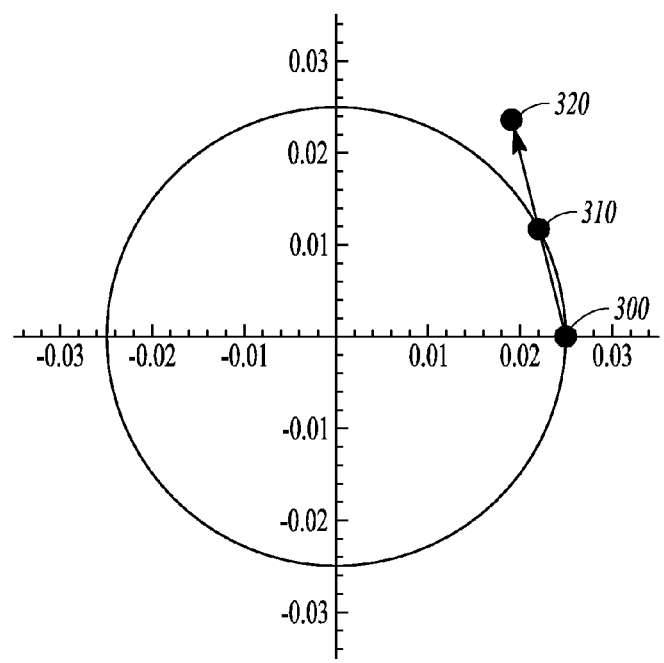
FIGS. 3A and 3B illustrate observed and predicted object locations and an OTCCD shift trajectory for an object when linear extrapolations from the locations observed in the first and second frame are used to make the prediction.
Figure 3B:
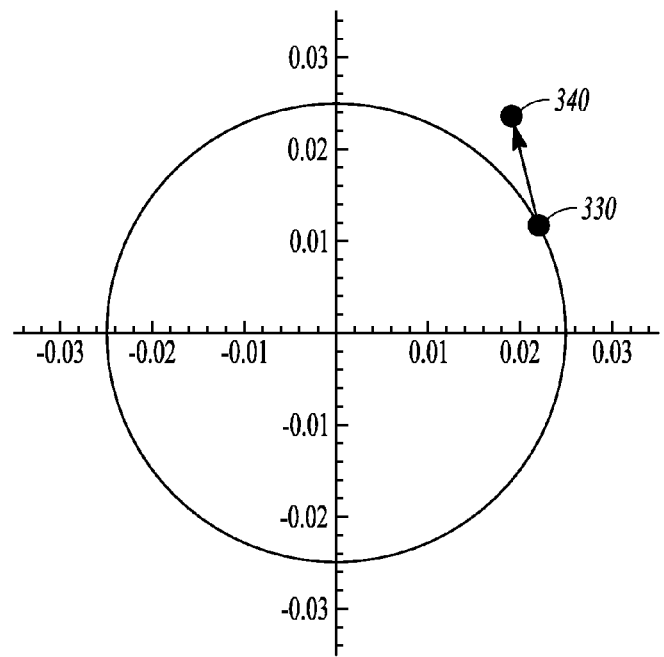

Referring to FIGS. 3A and 3B, the object depicted as a dot is rotating in the counterclockwise direction. The 2-frame controller embodiment uses object locations that are observed in the current frame 310 and a previous VVE camera frame (300) to predict where an object will be in a subsequent frame (320). After this determination, the OTCCD sensor is commanded to shift its array from its current location (330) to the predicted location (340).

Figure 4A:
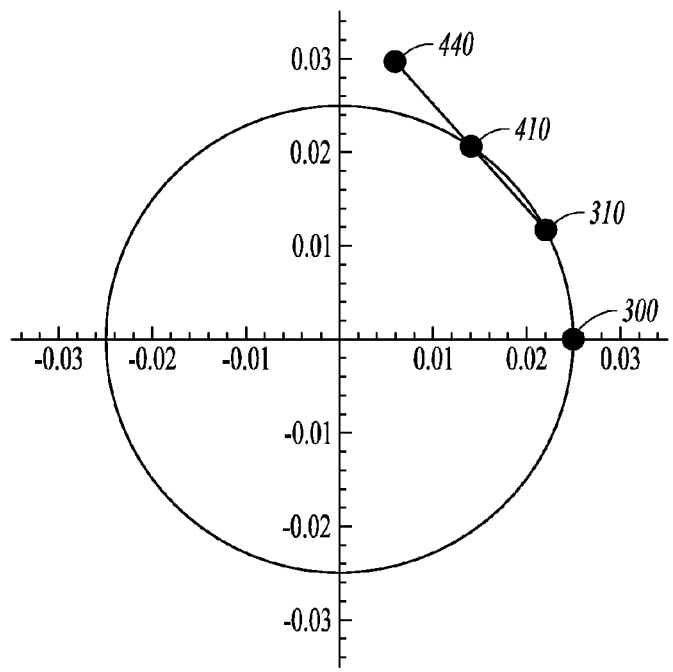
FIGS. 4A and 4B illustrate observed and predicted object locations and an OTCCD shift trajectory for an object after linear extrapolation from the locations observed in the second and third frame used to make the prediction.
Figure 4B:
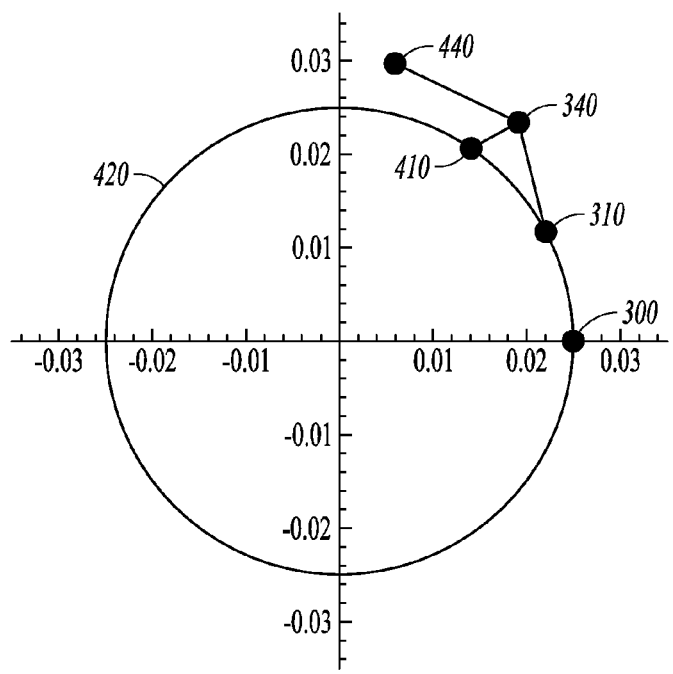
Figure 5:
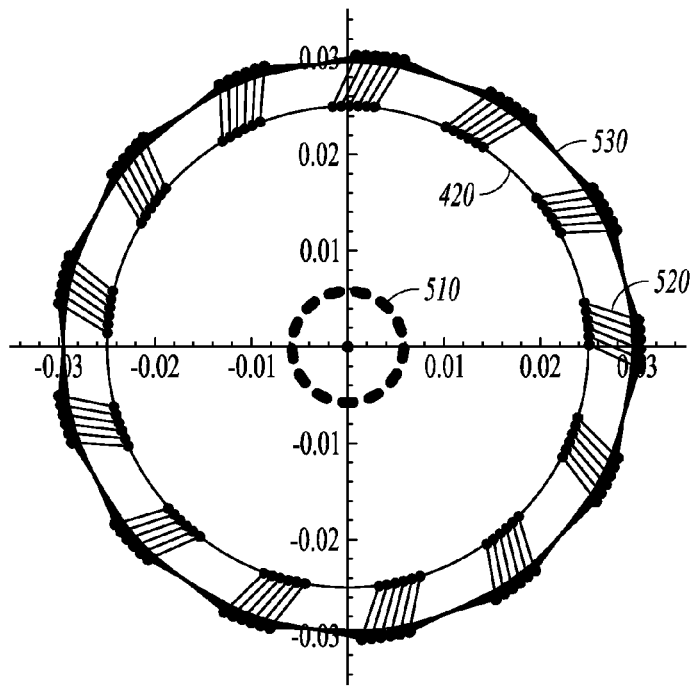
FIG. 5 illustrates discrepancies or tracking errors between predicted locations and observed locations recorded over many frames.

FIGS. 4A and 4B illustrate the situation after the third frame has arrived and the 2-frame controller updates, using the now current, 410, and past, 310, frames in the same manner as before, its prediction to the location 440. On receiving this information the orthogonal transfer CCD, which currently is at the location 340 will start moving over to the location 440. This correction will bring the prediction back closer to the circle of rotation, but as already may be suspected, the controller will never be able to catch up with the actual motion. As illustrated in FIG. 5, the OTCCD trajectory never converges on the orbit and there will be persistent tracking errors manifested as vectors 520 connecting observed and actual locations. Here, the predicted locations are referred to as actual, because while they were initially predicted by the controller, the OTCCD actually moved its array through them. The tracking error, both its amplitude and phase, results in tracking blur, which in this case manifests itself in the resulting OTCCD image by rendering the orbiting dot as a small circle rather than a dot. To illustrate its relative size, it is plotted (510) around the origin on the same scale as the orbit 420. The shape, into which the tracking error will distort the appearance of the dot, will vary with motion trajectory. It is noted however that a 2-frame controller has little or no tracking error for a constant velocity motion along a straight line.

Approximating the actual object motion trajectory locally by a straight line is the first of the two assumptions a controller designer must make. The second one concerns the length of the linear segment. If an object is orbiting at a constant angular velocity, then the distances traveled from frame to frame will be constant, and it can be assumed, as it was above, that the predicted segment length is the same as between the current and preceding frame. In reality, the object (dot in FIGS. 3 through 6) can still travel down the same trajectory, but arbitrarily accelerate or decelerate along the way. In one embodiment, the length of the current segment between the current and past observed location is compared with the lengths of one or more preceding segments, and the comparison is used to estimate the acceleration or deceleration trend. The same trend is then assumed to be continuing into the near future and serves as a basis for predicting the length of the segment connecting the current and predicted locations.

Figure 6:
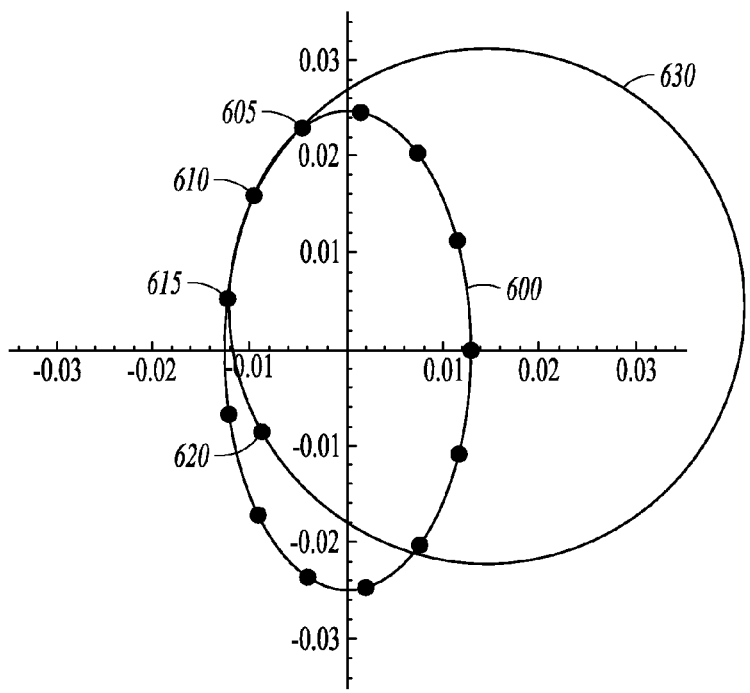
FIG. 6 illustrates the improved prediction accuracy due to circular extrapolation used for prediction in a 3-frame controller embodiment.

FIG. 6 illustrates functionalities of the 3-frame controller embodiment. In this example, the dot moves counterclockwise on an elliptical trajectory 600. The 3-frame controller uses object locations observed in the current frame 615 and two previous VVE camera frames (605, 610) to predict where an object should be in a subsequent frame (620). In an embodiment, the most recent two previous frames are used. As illustrated in FIG. 6, the 3-frame controller fits a circle 630 through the three observed locations 605, 610, 615, and anticipates that the predicted location will be positioned somewhere on the circle. The 3-frame controller also estimates the acceleration and deceleration of the object by comparing the lengths of its two or more constituent segments, depending on how many observed locations it uses to fit the circle. The 3-frame controller always provides error free tracking for circular motion. And while tracking an object moving in an elliptical orbit shows a degree of error, the error is smaller than it would have been had the 2 frame controller been used to track the elliptical motion. In either case, any error can be minimized with an increase in the sample density.

In the above examples, the predicted location refers to where the moving target is expected to be found in the first device frame immediately following the current frame. In an embodiment, the predicted location may refer to where the moving target is to be found in a frame that is any number of frames ahead of the current frame. Extending the prediction horizon allows the system to work with hardware whose processing time is longer than one first device frame period.

Using more than three points to define a circle leads to an overdetermined problem. Because a circle is defined by a quadratic equation, solving the problem may be possible only by numerical methods unless the problem is suitably formulated. Due to their iterative nature, such methods are not suitable for real time processing when high frame rates are required. In one embodiment, a least mean square error (LMSE) formulation of the fitting circle problem to any number of observations involves no iterative numerical search for the best fit and thus can execute in real time.

Figure 7:
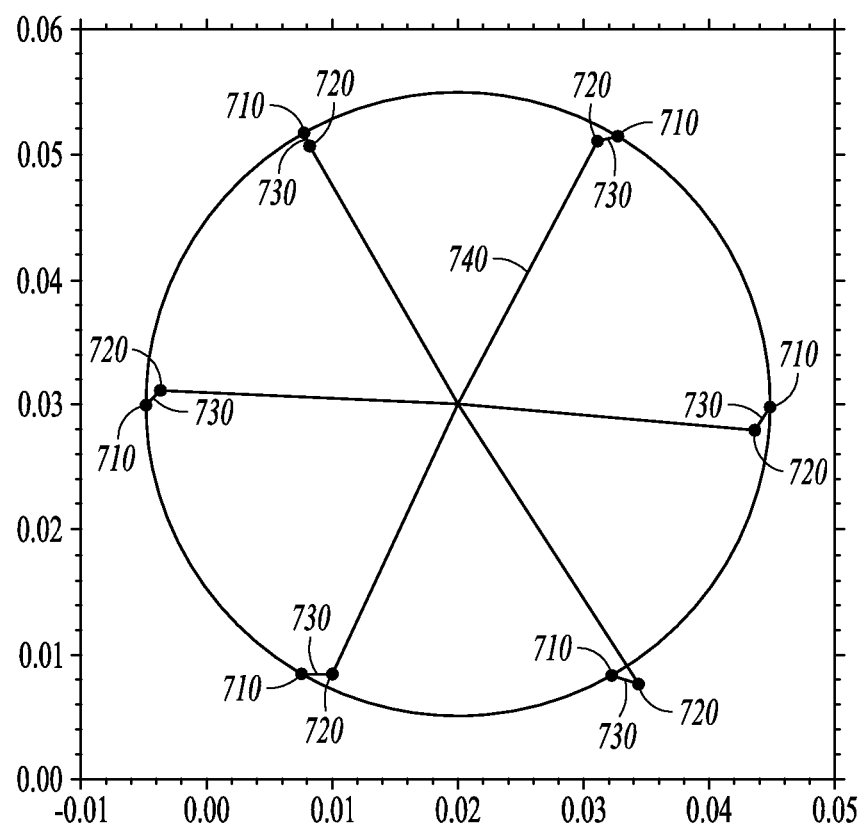
FIG. 7 illustrates actual points and observed points in connection with an n-frame controller embodiment.

To formulate the problem, it is noted that an object revolves in an orbit with a center and a radius. Because observations of the object are noisy, the object predictions differ from the actual locations by a random error. FIG. 7 illustrates the actual points 710 and the observed points 720, and the respective location errors 730. An ideal best fit would minimize the sum of the lengths of the vectors 730. However, the actual locations are unknown and thus we cannot compute the vectors 730. Therefore, what is considered instead is a connector measured along radials from the sample locations to their intersection with the circle that is being fitted. The radials emanate from the center and pass through the observed locations of the samples. They are illustrated at 740 in FIG. 7. The sum of the squared lengths of these connectors is a function of a yet unknown center and radius of the sought after circle. A solution in this embodiment minimizes this function using closed form formulae.

Alternatively, a circular or another, more complex path may be fitted to observed locations using the Kalman filter. In one embodiment, the filter replaces the Fit circle block 860C in FIG. 8.

Figure 8:
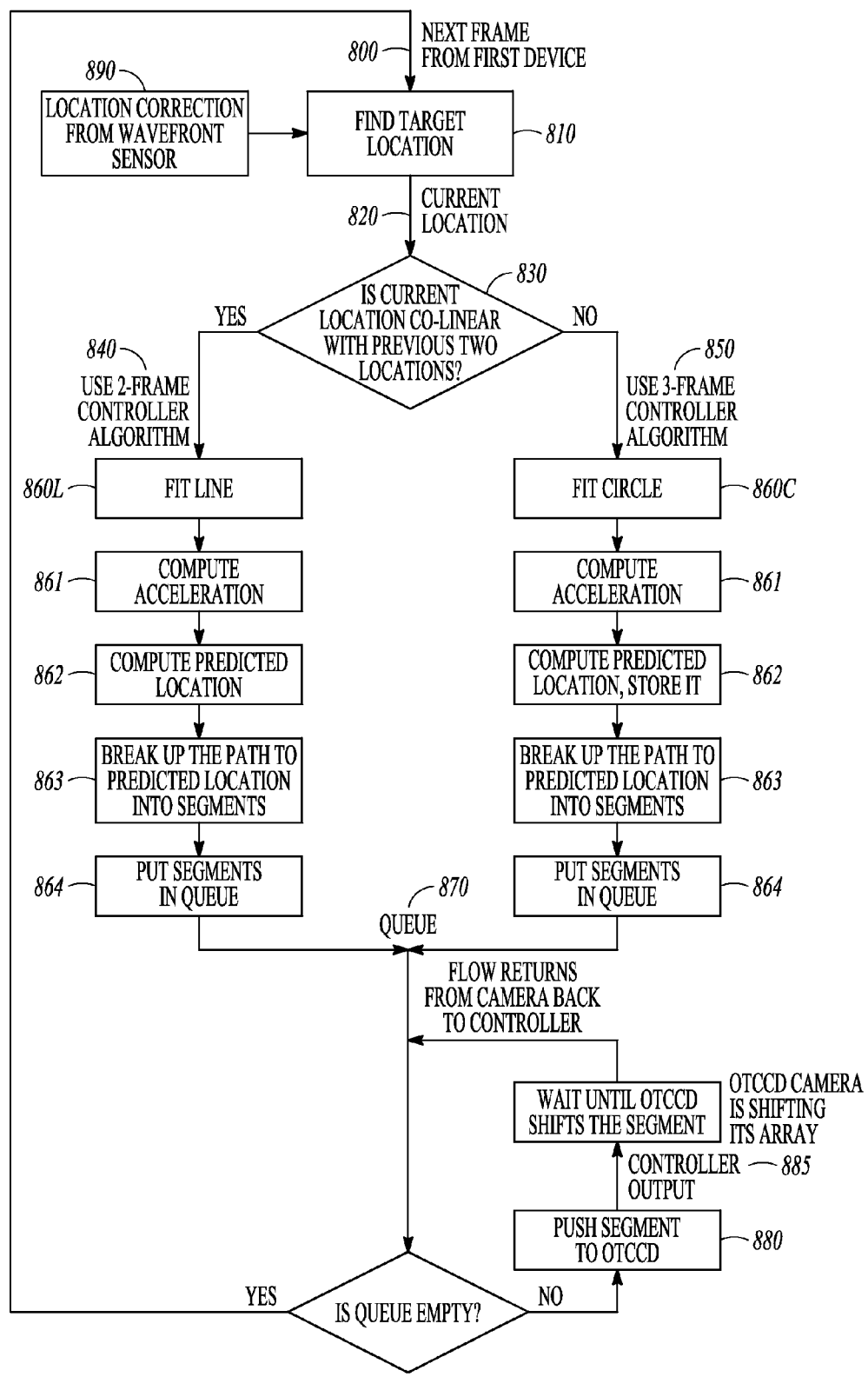
FIG. 8 illustrates a flowchart of an example process for stabilizing an image using an orthogonal transfer charge coupled device.

FIG. 8 is a flowchart of the controller. Upon receiving a new frame 800 from the first device, the velocity vector estimator 810 locates the moving target (the dot in the previous examples) in it and sends its coordinates 820 to the controller. Internally, the controller has two branches, one executing the 2-frame algorithm (840), the other executing the 3-frame algorithm (850). The branch selection is made in the decision block 830, in which the current location 820 is tested for colinearity with previous observed locations. The two branches differ only in their use of the motion trajectory approximation, which is either a straight line 860L or circle 860C. Once the approximation is found, both algorithms compute the motion acceleration or deceleration 861, enabling them to position the prediction on the approximating trajectory (862). Because the predicted location may be far out from the location at which OTCCD happens to be initially, its path from its current location to the predicted location is broken up into a small number of short linear segments (863), which track more closely the intended circular path. The segments are defined by their endpoints whose coordinates are put into a queue (864, 870), from which they are pushed one after another (880) and output from the controller at the point 885. From there they are sent to OT CCD camera to be traced by its sensor array. Once the shift defined by a segment is performed, the OTCCD camera informs the controller to send another segment from its queue. This process repeats until the queue is emptied, at which point the first device sends a new frame 800 containing updated target observation. This cycle continues as long as the OTCCD camera shutter is open.

The velocity vector estimator may correct the predicted location of the object so as to account for optical instability of the atmosphere using data obtained from a wavefront sensor. For example, in an embodiment, a laser projected onto a human face can provide a reference for wavefront aberration measurements. A biometric imaging system can include a laser, a wavefront sensor, and an optical system. The laser is configured to project a laser spot onto a skin portion of a human face, and the optical system is configured to collect scattered light from the laser spot and relay the light to the wavefront sensor. The system can further include an adaptive optical element and a controller configured to provide actuation commands to the adaptive optical element based on a wavefront distortion measurement output from the wavefront sensor. The optical system is further configured to relay image light to an image camera of the optical system. The image camera can be an iris camera that is configured for obtaining iris images suitable for biometric identification.

Figure 9:
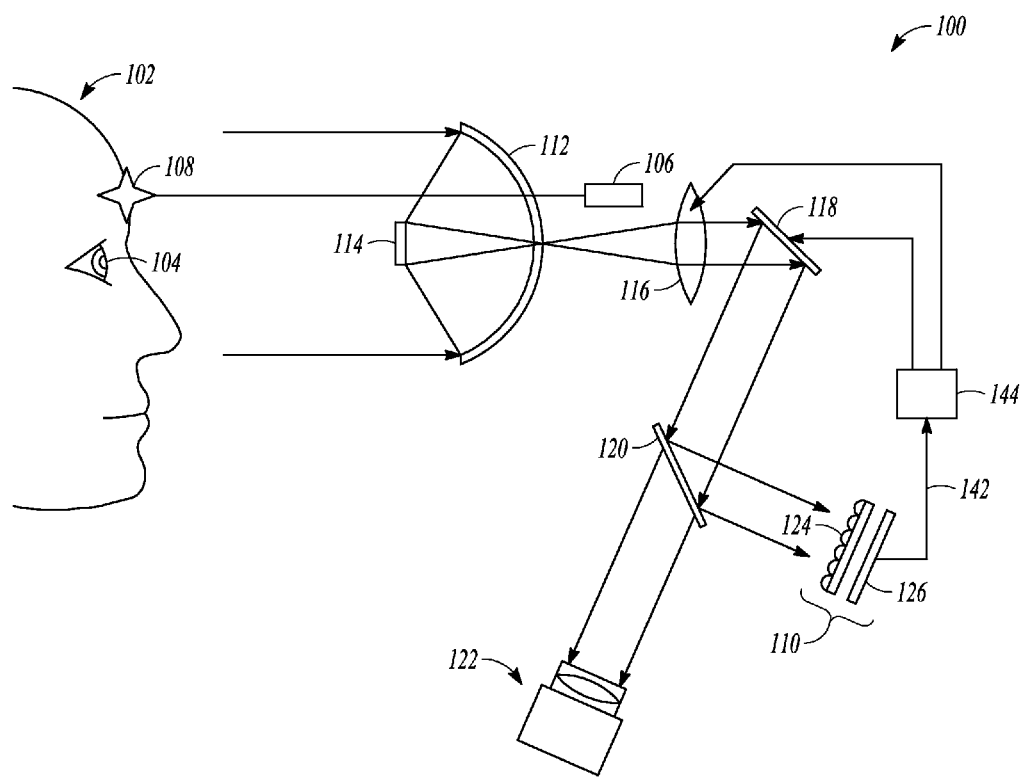
FIG. 9 illustrates an example biometric system that can be used in connection with accounting for optical instability of the atmosphere using a wavefront sensor.

FIG. 9 illustrates an example biometric system 100 that can be used in connection with accounting for optical instability of the atmosphere using a wavefront sensor. The system 100 can image a person of interest 102. The system 100 images an iris 104 of a person 102. The system 100 includes a laser 106 that is configured to project a laser spot 108 onto the face of a person 102. The system 100 can further include an optical system that is configured to collect scattered light from the laser spot and relay the light to a wavefront sensor 110. The optical system includes a primary minor 112 and a secondary minor 114 configured essentially as a reflector telescope. The optical system can include a lens 116, a minor 118, and a beam splitter 120. The beam splitter 120 provides light from the individual or scene that is being imaged to the wavefront sensor 110 and the image camera 122. The system 100 can further include a microlens array 124 and a focal plane sensor array 126. The output 142 from the system 100 is processed by controller 144.

In another embodiment suggested in FIG. 8, the output 142 from the system 100 is fed into the VVE through its input 890. The VVE estimator processes the data communicated on the link 142 and uses the result to correct the locations observed in the next frame 800.

Example Embodiments

Example No. 1 is an apparatus that includes an image sensing device, a velocity vector estimator (VVE) coupled to the image sensing device, a controller coupled to the velocity vector estimator, and an orthogonal transfer charge-coupled device (OTCCD), comprising an image array of pixels, coupled to the controller. The image sensing device is configured to transmit a plurality of image frames to the velocity vector estimator. The controller is configured to receive from the velocity vector estimator a location of an object in a current frame, to store locations of the object in one or more previous frames, to predict a motion path for a predicted location of the object in a subsequent frame as a function of the locations of the object in the current frame and the one or more previous frames, and to transmit the predicted location of the object to the OTCCD. The OTCCD is configured to shift the image array of pixels as a function of the predicted location of the object.

Example No. 2 includes the features of Example No. 1, and optionally includes a controller configured to divide the predicted motion path into a plurality of segments, and to transmit coordinates of the segments to the OTCCD.

Example No. 3 includes the features of Example Nos. 1-2, and optionally includes a controller configured to examine the location of the object in the current frame and two or more previous frames, and to determine if the locations in the current frame and the two or more previous frames are approximately co-linear.

Example No. 4 includes the features of Example Nos. 1-3, and optionally includes a controller configured to predict the location of the object using a linear extrapolation when the locations of the object in the current frame and the two or more previous frames are approximately co-linear.

Example No. 5 includes the features of Example Nos. 1-4, and optionally includes a controller configured to predict the location of the object by fitting a circle to the locations of the object in the current frame and the two or more previous frames when the locations of the object in the current frame and the two or more previous frames are not co-linear.

Example No. 6 includes the features of Example Nos. 1-5, and optionally includes a controller configured to estimate acceleration or deceleration of the object by comparing distances between locations of the object in the current frame and the two or more previous frames.

Example No. 7 includes the features of Example Nos. 1-6, and optionally includes a controller that incorporates the estimated acceleration or deceleration of the object to predict a location of the object in the subsequent frame. It is assumed that the acceleration or deceleration remains constant until the subsequent frame is exposed.

Example No. 8 includes the features of Example Nos. 1-7, and optionally includes a controller that incorporates the estimated acceleration or deceleration of the object to predict a location of the object in the subsequent frame, wherein it is assumed that the acceleration or deceleration trend defined by a selected number of higher order derivatives of motion remains constant until the subsequent frame is exposed.

Example No. 9 includes the features of Example Nos. 1-8, and optionally includes an apparatus that comprises a biometric eye analyzer.

Example No. 10 includes the features of Example Nos. 1-9, and optionally includes an apparatus comprising a scope for a firearm or other device.

Example No. 11 includes the features of Example Nos. 1-10, and optionally includes a velocity vector estimator configured to correct the predicted location of the object so as to account for optical instability of the atmosphere using data obtained from a wavefront sensor.

Example No. 12 is a computer readable storage device comprising instructions that when executed by a processor execute a process. The process includes transmitting a plurality of image frames from an image sensing device to a velocity vector estimator, receiving at a controller a location of an object in a current frame, storing locations of the object in one or more previous frames, predicting a motion path for a predicted location of the object in a subsequent frame as a function of the locations of the object in the current frame and the one or more previous frames, transmitting the predicted location of the object to an orthogonal transfer charge-coupled device (OTCCD), and shifting the image array of pixels as a function of the predicted location of the object.

Example No. 13 includes the features of Example No. 12, and optionally includes instructions for dividing the predicted motion path into a plurality of segments, and transmitting coordinates of the segments to the OTCCD.

Example No. 14 includes the features of Example Nos. 12-13, and optionally includes instructions for examining the location of the object in the current frame and two or more previous frames, and determining if the locations in the current frame and the two or more previous frames are approximately co-linear.

Example No. 15 includes the features of Example Nos. 12-14, and optionally includes instructions for predicting the location of the object using a linear extrapolation when the locations of the object in the current frame and the two or more previous frames are approximately co-linear; and for predicting the location of the object by fitting a circle to the locations of the object in the current frame and the two or more previous frames when the locations of the object in the current frame and the two or more previous frames are not co-linear.

Example No. 16 includes the features of Example Nos. 12-15, and optionally includes instructions for estimating acceleration or deceleration of the object by comparing distances between locations of the object in the current frame and the two or more previous frames; and for incorporating the estimated acceleration or deceleration of the object to predict a location of the object in the subsequent frame. It is assumed that the acceleration or deceleration remains constant until the subsequent frame is exposed.

Example No. 17 is a process including transmitting a plurality of image frames from an image sensing device to a velocity vector estimator, receiving at a controller a location of an object in a current frame, storing locations of the object in one or more previous frames, predicting a motion path for a predicted location of the object in a subsequent frame as a function of the locations of the object in the current frame and the one or more previous frames, transmitting the predicted location of the object to an orthogonal transfer charge-coupled device (OTCCD), and shifting the image array of pixels as a function of the predicted location of the object.

Example No. 18 includes the features of Example No. 17, and optionally includes dividing the predicted motion path into a plurality of segments, and transmitting coordinates of the segments to the OTCCD.

Example No. 19 includes the features of Example Nos. 17-18, and optionally includes examining the location of the object in the current frame and two or more previous frames, and determining if the locations in the current frame and the two or more previous frames are approximately co-linear.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. An apparatus comprising:
    an image sensing device;
    a velocity vector estimator (VVE) coupled to the image sensing device;
    a controller coupled to the velocity vector estimator; and
    an orthogonal transfer charge-coupled device (OTCCD), comprising an image array of pixels, coupled to the controller;
    wherein the image sensing device is configured to transmit a plurality of image frames to the velocity vector estimator;
    wherein the controller is configured to receive from the velocity vector estimator a location of an object in a current frame;
    wherein the controller is configured to store locations of the object in one or more previous frames;
    wherein the controller is configured to predict a motion path for a predicted location of the object in a subsequent frame as a function of the locations of the object in the current frame and one or more previous frames;
    wherein the controller is configured to transmit the predicted location of the object to the OTCCD; and
    wherein the OTCCD is configured to shift the image array of pixels as a function of the predicted location of the object.

2. The apparatus of claim 1, wherein the controller is configured to divide the predicted motion path into a plurality of segments, and to transmit coordinates of the segments to the OTCCD.

3. The apparatus of claim 1, wherein the controller is configured to examine the location of the object in the current frame and two or more previous frames, and to determine if the locations in the current frame and the two or more previous frames are approximately co-linear.

4. The apparatus of claim 3, wherein the controller is configured to predict the location of the object using a linear extrapolation when the locations of the object in the current frame and the two or more previous frames are approximately co-linear.

5. The apparatus of claim 3, wherein the controller is configured to predict the location of the object by fitting a circle to the locations of the object in the current frame and the two or more previous frames when the locations of the object in the current frame and the two or more previous frames are not co-linear.

6. The apparatus of claim 4 or 5, wherein the controller is configured to estimate acceleration or deceleration of the object by comparing distances between locations of the object in the current frame and the two or more previous frames.

7. The apparatus of claim 6, wherein the controller incorporates the estimated acceleration or deceleration of the object to predict a location of the object in the subsequent frame, wherein it is assumed that the acceleration or deceleration remains constant until the subsequent frame is exposed.

8. The apparatus of claim 6, wherein the controller incorporates the estimated acceleration or deceleration of the object to predict a location of the object in the subsequent frame, wherein it is assumed that the acceleration or deceleration trend defined by a selected number of higher order derivatives of motion remains constant until the subsequent frame is exposed.

9. The apparatus of claim 1, wherein the apparatus comprises a biometric eye analyzer.

10. The apparatus of claim 1, wherein the apparatus comprises a scope for a firearm or other device.

11. The apparatus of claim 1, wherein the velocity vector estimator is configured to correct the predicted location of the object so as to account for optical instability of the atmosphere using data obtained from a wavefront sensor.

12. A computer readable storage device comprising instructions that when executed by a processor execute a process comprising:
  transmitting a plurality of image frames from an image sensing device to a velocity vector estimator;
  receiving at a controller a location of an object in a current frame;
  storing locations of the object in one or more previous frames;
  predicting a motion path for a predicted location of the object in a subsequent frame as a function of the locations of the object in the current frame and the one or more previous frames;
  transmitting the predicted location of the object to an orthogonal transfer charge-coupled device (OTCCD); and
  shifting the image array of pixels as a function of the predicted location of the object.

13. The computer readable storage device of claim 12, comprising instructions for dividing the predicted motion path into a plurality of segments, and transmitting coordinates of the segments to the OTCCD.

14. The computer readable storage device of claim 12, comprising instructions for examining the location of the object in the current frame and two or more previous frames, and determining if the locations in the current frame and the two or more previous frames are approximately co-linear.

15. The computer readable storage device of claim 12, comprising instructions for predicting the location of the object using a linear extrapolation when the locations of the object in the current frame and the two or more previous frames are approximately co-linear; and for predicting the location of the object by fitting a circle to the locations of the object in the current frame and the two or more previous frames when the locations of the object in the current frame and the two or more previous frames are not co-linear.

16. The computer readable storage device of claim 15, comprising instructions for estimating acceleration or deceleration of the object by comparing distances between locations of the object in the current frame and the two or more previous frames; and for incorporating the estimated acceleration or deceleration of the object to predict a location of the object in the subsequent frame, wherein it is assumed that the acceleration or deceleration remains constant until the subsequent frame is exposed.

17. A process comprising:
  transmitting a plurality of image frames from an image sensing device to a velocity vector estimator;
  receiving at a controller a location of an object in a current frame;
  storing locations of the object in one or more previous frames;
  predicting a motion path for a predicted location of the object in a subsequent frame as a function of the locations of the object in the current frame and the one or more previous frames;
  transmitting the predicted location of the object to an orthogonal transfer charge-coupled device (OTCCD); and
  shifting the image array of pixels as a function of the predicted location of the object.

18. The process of claim 17, comprising dividing the predicted motion path into a plurality of segments, and transmitting coordinates of the segments to the OTCCD.

19. The process of claim 17, comprising examining the location of the object in the current frame and two or more previous frames, and determining if the locations in the current frame and the two or more previous frames are approximately co-linear.

* * * * *